United States Patent [19]

Morton

[11] Patent Number: 4,884,366
[45] Date of Patent: Dec. 5, 1989

[54] MICRO-CLIMATE PLANT GROWING SYSTEM

[76] Inventor: George J. Morton, P.O. Box 163, Somis, Calif. 93066

[21] Appl. No.: 245,584

[22] Filed: Sep. 16, 1988

[51] Int. Cl.⁴ .......................................... A01G 31/00
[52] U.S. Cl. ...................................................... 47/62
[58] Field of Search .................. 47/17, 18, 60, 65, 62, 47/63, 64

[56] References Cited

U.S. PATENT DOCUMENTS

| | | | |
|---|---|---|---|
| 3,807,088 | 4/1974 | Jones | 47/17 X |
| 3,925,928 | 12/1975 | Constantinescu et al. | 47/17 |
| 4,003,160 | 1/1977 | Miller | 47/58 |
| 4,016,677 | 4/1977 | Julinot | 47/64 |
| 4,198,783 | 4/1980 | Leroux | 47/60 |
| 4,267,664 | 5/1981 | Henke | 47/1.1 |
| 4,309,843 | 1/1982 | Kato | 47/18 |
| 4,315,381 | 2/1981 | Dvorin | 47/59 |
| 4,327,538 | 4/1982 | Milhem et al. | 56/1 |
| 4,379,375 | 4/1983 | Eisenberg et al. | 47/65 |
| 4,476,651 | 10/1984 | Drury | 47/65 |
| 4,514,930 | 5/1985 | Schorr et al. | 47/60 |
| 4,780,989 | 11/1988 | Mears | 47/65 |

OTHER PUBLICATIONS

Invention Registration No. H239, by K. Franklin et al. dated 3/3/87.

*Primary Examiner*—Robert A. Hafer
*Assistant Examiner*—Lynda M. Cofsky
*Attorney, Agent, or Firm*—Kenneth J. Hovet

[57] ABSTRACT

A system is provided for creating a localized climate around plants. Troughs containing plants in a growing medium are arranged in rows over the open top of a plenum chamber. The chamber is pressurized with air preconditioned for the particular plant species. The troughs are spaced-apart to define air passages therebetween that guide the conditioned air from the chamber through the passages and past the plants. For larger plants, deflector plates can be used between the troughs for restricting air flow to areas adjacent the troughs.

18 Claims, 2 Drawing Sheets

MICRO-CLIMATE PLANT GROWING SYSTEM

BACKGROUND OF THE INVENTION

1. Field of the Invention

The invention relates to plant growing systems and, more particularly, to the control of air in close proximity to growing plants.

2. Description of the Prior Art

In commercial horticulture, it is conventional to utilize large greenhouses for growing plants. This allows a grower to control air temperature and humidity in the greenhouse for optimizing plant growth.

With large operations, several greenhouses may be used each of which typically exceed 150 feet in length and 50 feet in width. In such cases, the volume of air to be conditioned per greenhouse exceeds 75,000 cubic feet. Obviously, the energy expended in cooling/heating and humidifying such a large volume of air space is very high and adversely affects profitability.

There is also the problem that different plants require different growing conditions. This conflicts with greenhouse versatility and oftentimes requires growers to make concessions and grow some plants under less than optimum conditions. Again, this negatively impacts on costs and profitability.

SUMMARY OF THE INVENTION

In its broadest terms, the invention seeks to control the air directly adjacent growing plants rather than the entire air space above the plants. This concept has particular applicability to elongated troughs containing a growing medium from which a plant will grow.

Typically, such troughs are supported in rows above ground upon a framework within a greenhouse. The invention contemplates enclosing the framework with sidewalls to create a plenum chamber. Air means provides conditioned air to the chamber which exits the chamber through the open area between troughs.

To direct the air past the side panels of each trough, and thereby past the leaves of plants growing therein, air deflector plates may be used. The plates partially cover the open areas and define air outlets from the chamber for the conditioned air.

DESCRIPTION OF THE PREFERRED EMBODIMENTS

Figure 1:
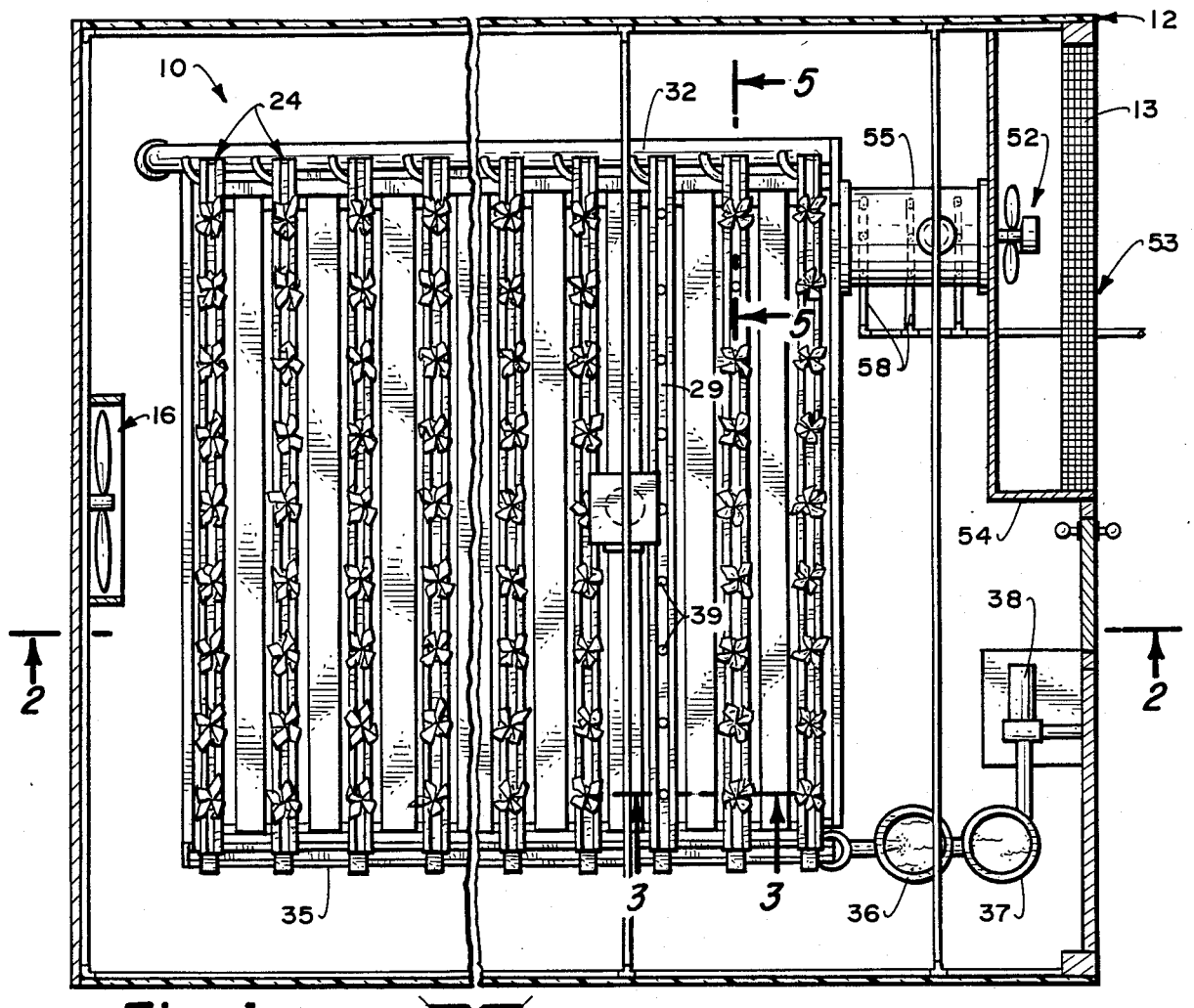
FIG. 1 is a top plan view of the micro-climate growing system of the invention housed within a greenhouse.
Figure 2:
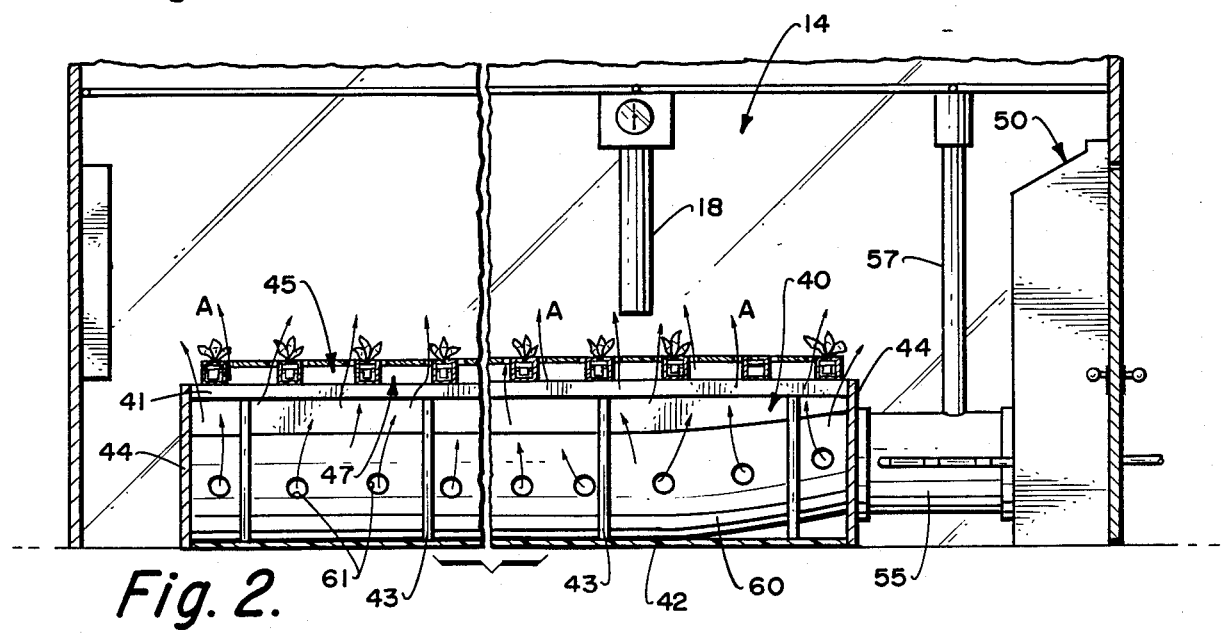
FIG. 2 is a cross-sectional view taken along lines 2—2 of FIG. 1.

With reference now to the drawings, FIGS. 1 and 2 show the overall micro-climate system 10 of the invention. The system is housed within a greenhouse 12 having a translucent roof enclosing a surrounding airspace 14. The greenhouse may include an exhaust means shown as exhaust fan 16. Other means such as roof vents, air turbines and louvered windows may also be used. An airspace temperature and humidity sensor 18 is located above the growing area to measure the condition of air as it flows past plants 20.

While other plant growing means may be utilized, the merits of the invention are most readily exemplified by reference to hydroponic growing techniques. The hydroponic system utilized herein is an adaptation of that described in U.S. Pat. No. 4,379,375 which is herein incorporated by reference.

Figure 3:
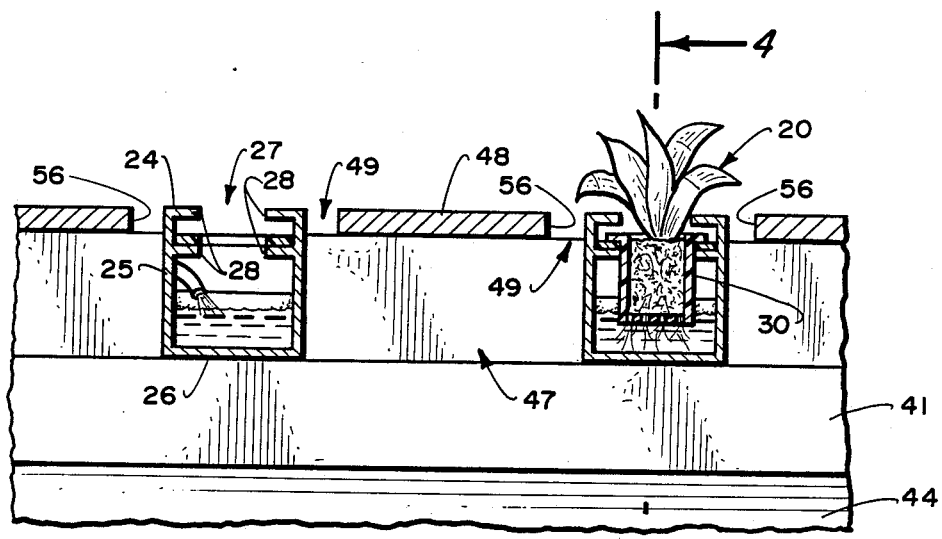
FIG. 3 is a cross-sectional view taken along lines 3—3 of FIG. 1.
Figure 4:
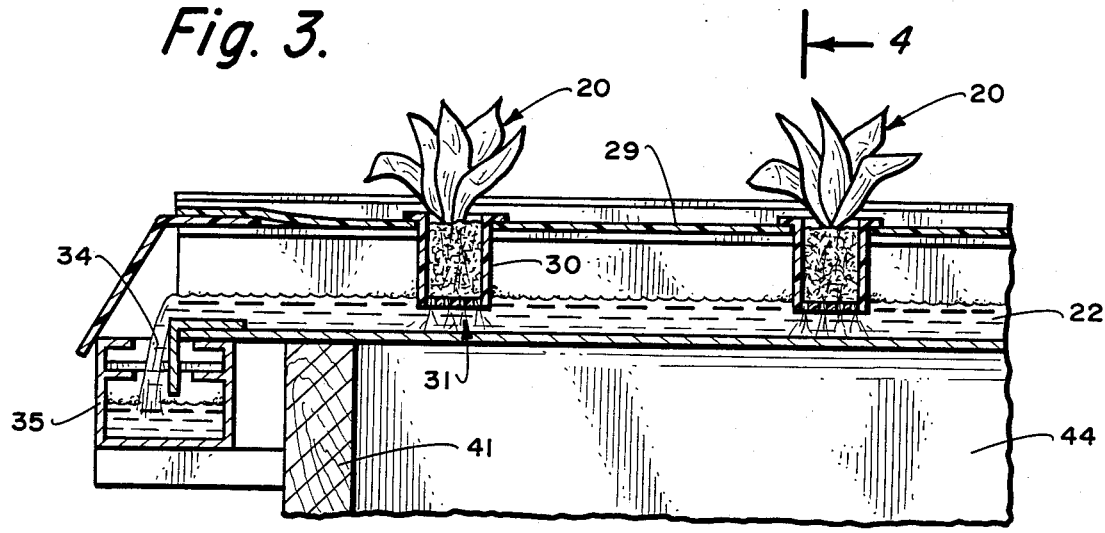
FIG. 4 is a cross-sectional view taken along lines 4—4 of FIG. 3.
Figure 5:
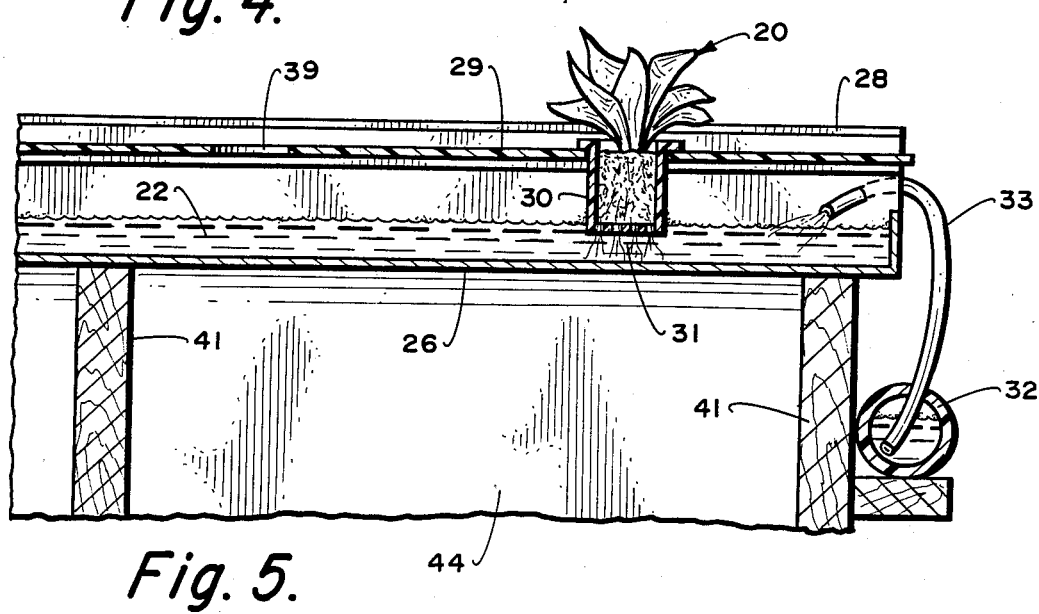
FIG. 5 is a cross-sectional view taken along lines 5—5 of FIG. 1.

With particular attention to FIGS. 3–5, a growing medium, such as nutrient solution 22, is pumped to U-shaped troughs 24. Each trough has an overall elongated straight shape with a generally U-shaped cross-section. The cross-section comprises opposing side panels 25 which are connected by a bottom wall 26. The open top 27 of each trough is defined by opposing inwardly facing bifurcated flanges 28. The flanges support a flexible strip 29 which carries small plant containers 30. Each container has bottom openings through which plant roots 31 extend into the nutrient solution.

The solution enters a distribution pipe 32 and flows through feeder lines 33 into each trough. A predetermined solution level is reached in the troughs which is sufficient to reach at least the bottom of each container 30. Solution overflow 34 discharges into collector trough 35 which directs the discharge into recycle tank 36. It is then mixed with fresh solution in mixer tank 37 and recycled back to the distribution pipe with pump 38.

The nutrient solution preferably continuously circulates through the troughs and its temperature and composition are carefully monitored. It is within the scope of the invention to control the solution temperature by heat exchange means well known in the art. Further, the solution composition and pH are controlled in accordance with the requirements of the plants being grown.

The plant growing cycle is started by placement of a seed and soil material in container 30. The seed is germinated by placing the container in a shallow tray of solution or water for 3–4 days. The container is then transferred to an aperture 39 in strip 29 where the plant grows to maturity. For harvesting, the strip is withdrawn from the trough and the plant is severed from its roots. It is then packaged for transport and sale.

During the growing cycle, the plant roots are supplied with the controlled nutrient solution and the plant leaves are supplied with air which is conditioned to provide the maximum in growth rate. The invention has particular application for growing plants such as lettuce and spinach where cool air and a cool root zone are needed. Conversely, the leaves and/or roots could be heated.

To effect a localized controlled climate about each plant, a substantially air-tight containment housing or plenum chamber 40 is formed beneath one or more troughs 24. The troughs are supported by a framework which may consist of spaced-apart cross-beams 41. Posts 43 support the beams above floor 42. The distance of the beams above the floor or ground level is preferably about 3–5 feet to facilitate a convenient working height and readily controllable air volume.

To enclose the framework periphery, sidewalls 44 are secured to the opposing ends and sides of the cross-beams. Most conveniently, the sidewalls comprise panels of plywood but could be constructed of boards, plastic sheets or heavy canvas. The sidewalls extend from the floor to the cross-beams and cover the entire outline of the framework. Except for the cross-beams, a closed chamber with an unobstructed chamber open top 45 is created.

As shown in FIG. 1, the framework outline consists of a rectangular shape. It will be appreciated, however, that other polygonal shapes may be used as dictated by space limitations, plant type and worker accessibility.

To facilitate strip handling, plant harvesting, solution connections and uniform gravity flow of nutrient solutions, it is desirable that the troughs have a uniform elevation, an equal length and opposing ends in alignment. Also, the troughs and strip apertures should be spaced-apart from each other a predetermined distance to allow for plant growth.

As shown, the troughs partially cover the chamber open top and extend transversly across the top edges of cross-beams 41. They are preferably arranged coextensively in parallel rows with uniform spacing between each trough. The spacing between each trough defines an open area in communication with the chamber open top.

It can be seen that within the open area passages 47 will be created for air to exit from the chamber therebelow. However, in cases where broad leafy plants are being grown, the troughs may be spaced too far apart to allow effective air exchange. In such cases, deflector plates 48 are used to more effectively guide the air past the plants. Such plates overlie a predetermined portion of the passages 47 and create air outlets 49 in the uncovered portions of said passages.

The deflector plates most simply comprise thin structural members which are preferably rectangular in shape with opposing straight side edges 56. The area between each edge and corresponding trough side panel 25 comprises each air outlet 49.

Most conveniently, the deflector plates are centered along the middle of the open air with each edge 56 aligned parallel with a corresponding side panel 25. This arrangement forms slotlike air outlets which will have a uniform area throughout their length. This, in turn, creates substantially uniform air flow rates through the outlets and past the plants. Deflector plate width should range from fifty to ninety-five percent of the distance between adjacent troughs to create a small pressure drop and effective air exchange about the plants.

Diverging air flow patterns and eddy currents will naturally evolve from the air columns exiting each side of a trough. This achieves the desired localized climatization about each of the growing plants. However, it is within the purview of the invention to also scallop or otherwise pattern the plate edges to further enhance air circulation about the plants. Alternatively, the passages 47 may be entirely covered with the deflector plate which will have specified orifices therethrough. This will allow further variation in air flow patterns and possibly better air condition certain types of plants larger than lettuce or spinach.

The air means 50 provides conditioned air to the plenum chamber 40. It pressurizes the chamber and causes air flow through the air outlets 49. As best shown in FIGS. 1 and 2, the air means comprises intake fan 52 which draws air from outside the greenhouse 12 through a cooling/humidifying means 53 into fan housing 54.

The cooling/humidifying means may comprise evaporative cooler apparatus which are well known in the art. As shown in FIG. 1, liquid saturable medium 13 of such apparatus comprises a wall section of the greenhouse. This avoids extensive ductwork and high power requirements which are common in related installations.

The fan expells air from its housing through conduit 55 and into the plenum chamber 40. To monitor air as it flows into the chamber, the duct is provided with a temperature and humidity detector 57. If it's determined that the air lacks moisture, water may be sprayed by injectors 58 into the air as it passes through the duct.

An optional air distribution means, shown as distributor duct 60, may be used to more evenly disperse the conditioned air throughout the chamber. As shown, the duct extends along the length of said chamber adjacent one side thereof. It includes distributor openings 61 that face inwardly and are spaced-apart along the length of the duct.

To illustrate operation of the invention, a nutrient solution of predetermined composition will begin circulating through the troughs, recovery and make-up tanks. Containers in the strip apertures will contain plants at various stages of growth. For lettuce, the troughs will be spaced-apart about six inches as well as apertures 39 on strip 29.

As shown in FIG. 1, the troughs are arranged in parallel rows across chamber open top 45. Straight-edged deflector plates 48 are centered over air passages 49 between adjacent troughs. The plates are about four inches wide leaving about one inch gap on each side to form air outlets of about equal area. With minimum leakage and no other means for escape, substantially all air brought into chamber 40 will pass through the air outlets upwardly past plants 20 as shown by arrows A in FIG. 2.

Once the air has circulated around and past the plants, it enters airspace 14 where it is vented to the atmosphere or withdrawn by exhaust fan 16. The exhaust fan may assist air circulation about the plants by slightly increasing the pressure differential between the positively pressurized chamber and the airspace pressure.

Outside ambient air will be cooled and humidified as intake fan 52 draws it through the openwork of liquid saturable medium 13. Such medium comprises a grill with multiple small air channels over which water flows. The water flow and air intake can be controlled by means well known in the art. With especially dry air, water injectors 58 will be used to supplement the air moisture content.

With the above operation, it can be seen that a localized plant growing environment is created that provides substantial savings in energy costs. Instead of climatizing the airspace of an entire greenhouse, only air directly adjacent plants is controlled. Particularly with large commercial operations having multiple greenhouses, the cost savings are highly significant. Further, the invention provides substantial versatility in growing conditions. This allows different types of plants to be grown in a commercially viable manner not previously possible.

While the invention has been described with respect to preferred embodiments, it will be apparent that other variations may be made without departing from the scope and spirit of the invention. Accordingly, the invention is not to be limited by the aforementioned embodiments, but only by the scope of the appended claims.

I claim:

1. A system for climatizing plants comprising:

a plenum chamber defined by an enclosed framework with an open top;

two or more troughs containing plants extending across said open top, said troughs having opposing side panels with adjacent troughs separated by a space which forms an air passage in communication with said chamber, said air passage located between corresponding side panels of adjacent troughs;

a deflector plate supported by said frame work and extending between a adjacent pairs said troughs and thereby covering a portion of said space to form air outlets in communication with said chamber whereby said panels and said deflector plate direct air past said plants; and, air means for pressurizing said plenum chamber with conditioned air and causing said conditioned air to flow through said passages and past said plants.

2. The system of claim 1 wherein said air means includes a cooling/humidifying means and an intake fan, said fan moving air from said cooling/humidifying means to said chamber.

3. The system of claim 1 wherein said troughs comprise elongated structures containing a growing medium for said plants.

4. The system of claim 3 wherein said troughs extend parallel to each other and are spaced-apart about an equal distance.

5. A method for controlling air adjacent plants comprising:

arranging plants in an elongated trough containing a growing medium, said trough having opposing sides each defined by a side panel;

supporting said trough above a plenum chamber;

locating a deflector plate adjacent a side panel and said deflector plate being supported by said framework;

providing air outlets from said chamber with said deflector plate; and, supplying conditioned air to said chamber at a pressure greater than the pressure outside said chamber causing said conditioned air to flow through said outlets past said plants.

6. The method of claim 5 including the step of providing plant nutrient solution to said trough simultaneous with the step of supplying conditioned air to said chamber.

7. The method of claim 6 wherein said plant nutrient solution is circulated through said trough.

8. The method of claim 5 wherein said plants and trough are enclosed by a greenhouse, including the step of:

exhausting air from said greenhouse to disperse said air currents.

9. The method of claim 8 wherein said greenhouse has a wall section comprising a liquid saturable medium wherein the step of supplying conditioned air to said chamber includes the step of:

drawing ambient air through said medium to condition said ambient air.

10. The method of claim 8 including the steps of:

providing a distributor duct with distributor openings in said chamber; and, passing said conditioned air through said duct and out said distributor openings.

11. The method of claim 5 including the step of controlling the temperature of said conditioned air prior to supplying it to said chamber.

12. The method of claim 5 including the step of injecting selected amounts of moisture to said conditioned air as it is supplied to said chamber.

13. A micro-climate plant growing system comprising:

an enclosed framework having a bottom from which extend upstanding peripheral sidewalls defining an open top;

a plurality of plant growing troughs arranged in rows over said open top, said troughs being spaced-apart from each other defining air passages between adjacent troughs;

air deflector plates supported by said framework and extending between said troughs and thereby covering said air passages between respective troughs with uncovered portions of said passages defining air outlets; and, air means to pressurize said enclosed framework and cause air flow through said air outlets.

14. The system of claim 13 including means for providing nutrient solution to said troughs; and, plants having roots growing in said solution.

15. The system of claim 13 wherein each of said air passages have about equal cross-sectional areas.

16. The system of claim 13 wherein said troughs are parallel and spaced-apart about equal distance.

17. The system of claim 13 wherein said troughs each include opposing side panels and said air outlets comprise elongated slots each of which are defined by an edge of said plate and a corresponding side panel of an adjacent trough.

18. The system of claim 13 wherein said air means includes an air distribution means extending into said enclosed framework.

* * * * *